United States Patent [19]

Long

[11] 4,202,254
[45] May 13, 1980

[54] AIR VENT AUTO'S

[76] Inventor: Alvin L. Long, Civilian Gen. Del., Beale, A.F.B., Long Ranch, Yuba County, Calif. 95903

[21] Appl. No.: 925,430

[22] Filed: Jul. 17, 1978

[51] Int. Cl.² .............................................. B06J 1/20
[52] U.S. Cl. ..................................... 98/2.12; 98/2.13; 296/84 B
[58] Field of Search ............................. 98/2.12, 2.13; 296/84 B

[56] References Cited

U.S. PATENT DOCUMENTS

| | | | |
|---|---|---|---|
| 2,764,928 | 10/1956 | Martinson | 98/2.12 |
| 2,797,126 | 6/1957 | Brooks | 98/2.12 |
| 3,667,369 | 6/1972 | Smith | 98/2.12 |
| 4,033,245 | 7/1977 | De Rees | 98/2.12 |
| 4,062,272 | 12/1977 | McCarroll | 98/2.12 |
| 4,134,612 | 1/1979 | Nelson | 98/2.12 |

Primary Examiner—Henry C. Yuen

[57] ABSTRACT

It has been found that many new cars have no wings or vents made into the door windows. What I propose is a blade that will be attached to the side view mirror of a vehicle, that will deflect the outside air into a vehicle. This blade will be permanently attached to the side view mirror, and will not interfere with the raising and lowering of the window, or the normal use of the side view mirror.

1 Claim, 2 Drawing Figures

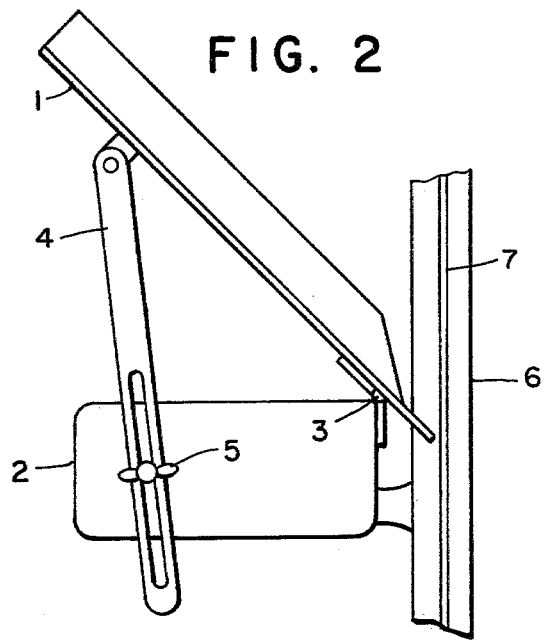
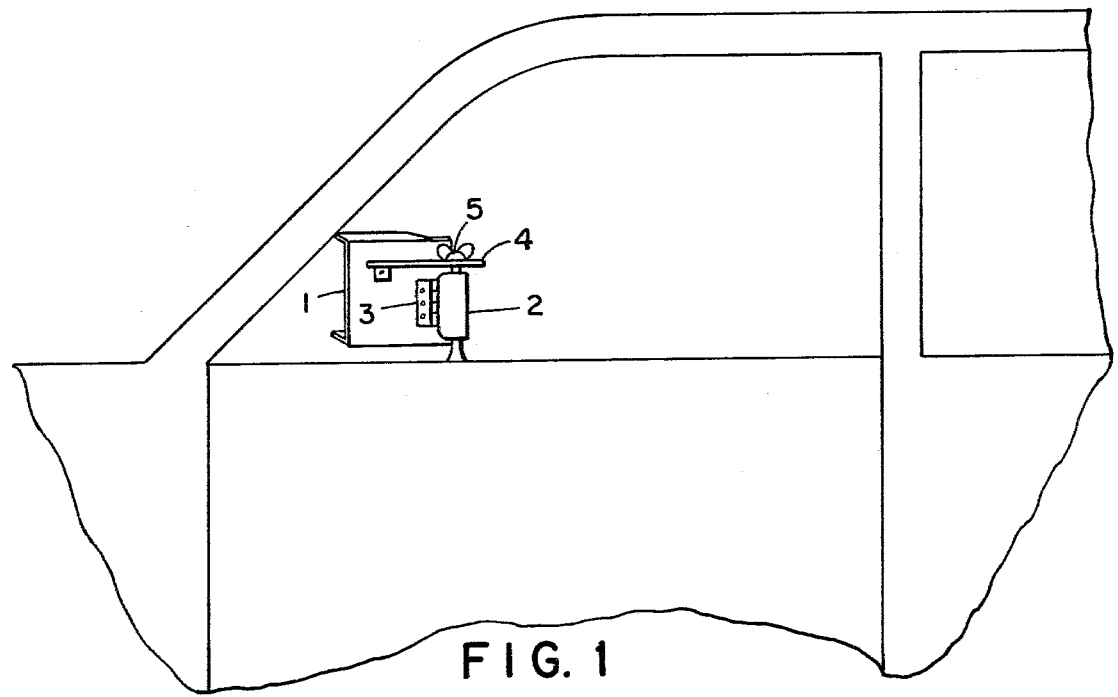

AIR VENT AUTO'S

SUMMARY

The present invention is directed to a vehicle air deflector that is mounted to the vehicles ridgid side view mirror housing, said housing having a internal mirror, many new vehicles are constructed without air deflectors in the side door window opening, said vehicles do however have a ridgid side view mirror housing that has a internal mirror, the present invention being light weight can be applied to the ridgid side view mirror housing thus eliminateing the need of a air deflector support structure, most air deflectors in the prior art require a support structure to put them in position near the front area of a window opening, thus the present invention is considered a improvement in the art. A adjustible arm between the outboard end of the hinged vertacly mounted air deflector blade and the outboard top edge of the ridgid side view mirror housing can be adjusted to change the angle of air deflection into the vehicle horizontally.

BRIEF DESCRIPTION OF THE DRAWINGS

In the drawings
FIG. 1 represents a side view of a automobile.
FIG. 2 represents a top view of a ridgid side view mirror housing with a air wing in place.

DETAILED DESCRIPTION OF THE DRAWINGS

In the drawings FIG. 1 is a side view of a vehicle and door, said door including a vertically moveable window, a side view mirror with a ridgid housing 2 and a internal mirror, said side view mirror 2 being mounted adjacent the front extremity of the window, a blade 1 is shown attached to the side view mirror housing 2, the blade 1 is held to the side view mirror by a hinge 3 and can be adjusted to various angles by the arm 4 and wing nut 5.

FIG. 2 is a top view of a ridgid side view mirror housing 2 applied to the side door 6 of a vehicle, the blade 1 is attached to the mirror housing 2 by hinges 3, the inboard end of the blade is very close to the window glass 7 when said window is in a closed position, the shape of the blade 1 and its inboard end being close to the window opening increases air flow into the vehicle, when said window is opened.

A holding arm 4 can be seen attached to the blade 1 and to the mirror housing, a wing nut 5 can be used to ajust the angle of the blade 1 so that air can be diverted into the vehicle at various angles. The present invention thus pertains particularly to vehicles that have no air deflector in the side door window opening, but do have a ridgid side view mirror housing that the present invention can be applied to.

What is claimed is:

1. A vehicle air deflector for use with a vehicle side door including a vertically movable window, a side view mirror, said side view mirror being mounted inside a ridgid mirror housing on the exterior of the door adjacent the front extremity of the window, a vertical hinge pivotally mounting a side portion of said air deflector against a side wall of said rigid mirror housing, an adjustable arm having one end pivotally mounted against the opposite side of said air deflector, the opposite end of said arm having an elongated slot to be engaged with a fixed threaded vertical pin on top of said mirror housing for regulating the angle of said air deflector with respect to said vehicle and a wing nut adjustably positioned along the threads of said vertical pin whereby said air deflector may be locked in position.

* * * * *